United States Patent [19]

Niebylski

[11] 4,182,120
[45] Jan. 8, 1980

[54] EXHAUST SYSTEMS

[75] Inventor: Leonard M. Niebylski, Birmingham, Mich.

[73] Assignee: Ethyl Corporation, Richmond, Va.

[21] Appl. No.: 776,109

[22] Filed: Mar. 10, 1977

Related U.S. Application Data

[63] Continuation-in-part of Ser. No. 368,741, Jun. 11, 1973, abandoned, which is a continuation-in-part of Ser. No. 343,105, Mar. 20, 1973, abandoned.

[51] Int. Cl.$^2$ .............................................. F01N 3/15
[52] U.S. Cl. .................................... 60/274; 60/299; 422/176; 422/180
[58] Field of Search ............... 60/274, 282, 299, 275, 60/301; 23/288 FC; 55/418; 73/205 L; 138/37; 422/176, 180

[56] References Cited

U.S. PATENT DOCUMENTS

| | | | |
|---|---|---|---|
| 1,893,372 | 1/1933 | Kryzanowsky | 60/288 |
| 3,071,160 | 1/1963 | Weichbrod | 73/205 L |
| 3,185,181 | 5/1965 | Demyan | 138/37 |
| 3,441,381 | 4/1969 | Keith | 60/299 |
| 3,597,166 | 8/1971 | Hochman | 55/418 |
| 3,696,618 | 10/1972 | Boyd | 60/285 |
| 3,749,130 | 7/1973 | Howitt | 55/418 |
| 3,773,894 | 11/1973 | Bernstein | 60/301 |

FOREIGN PATENT DOCUMENTS 910057 11/1962 United Kingdom ................... 23/288 F Primary Examiner—Douglas Hart
Attorney, Agent, or Firm—Donald L. Johnson; Robert A. Linn; Joseph D. Odenweller

[57] ABSTRACT

The useful life of a catalyst being used in an engine exhaust system to lower the undesirable constituents in the exhaust gas of an engine being operated on gasoline containing a cyclopentadienyl manganese antiknock is greatly prolonged by providing an exhaust system having a plurality of substantially parallel proximately spaced vanes in the exhaust flow path upstream from the catalyst.

14 Claims, 9 Drawing Figures

EXHAUST SYSTEMS

This application is a Continuation-in-Part of application Ser. No. 368,741, filed June 11, 1973 now abandoned, which in turn is a Continuation-in-Part of application Ser. No. 343,105, filed Mar. 20, 1973, now abandoned.

BACKGROUND

Cyclopentadienyl manganese compounds are excellent antiknocks in gasoline used to operate spark ignited internal combustion engines. Use of such compounds as antiknocks is described in U.S. Pat. No. 2,818,417; U.S. Pat. No. 2,839,552 and U.S. Pat. No. 3,127,351, incorporated herein by reference. Not only are these compounds effective antiknock agents, but it has also been found that they do not adversely affect the activity of catalysts used to decrease the amount of undesirable constituents in engine exhaust gas. Under some operating conditions it has been found that, although the manganese antiknocks do not lessen the activity of the exhaust gas catalyst, they can interact in some manner at the surface of the catalyst bed leading to a reduction in the size of the openings into the bed thereby causing an increase in exhaust back pressure. The present invention provides a simple effective means of alleviating this problem.

SUMMARY

According to the present invention, the useful life of an exhaust gas catalyst being used in an exhaust system of an engine operating on gasoline containing a cyclopentadienyl manganese antiknock is greatly increased by providing a plurality of substantially parallel proximately spaced vanes in the exhaust flow path upstream from the catalyst arranged such that their surface is substantially parallel to the flow path of exhaust gas in the exhaust system.

DESCRIPTION OF THE PREFERRED EMBODIMENTS

A preferred embodiment of the invention is an exhaust system for a spark ignited internal combustion engine, said system comprising a catalytic reactor containing a catalyst bed, said catalytic reactor being operatively connected to receive the exhaust gas from the exhaust outlet of said engine, and a plurality of substantially parallel proximately spaced vanes located in the exhaust flow path upstream from said catalyst bed, the surface of said vanes being substantially aligned with said exhaust flow path.

Figure 2:
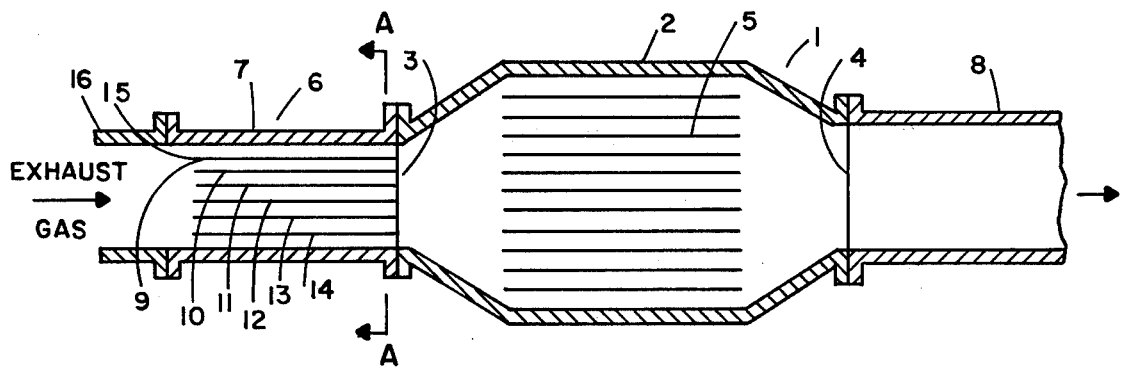
FIG. 2 is a longitudinal cross-section of a catalytic exhaust reactor having vanes in a unit connected to its inlet plenum.

The essential elements of such a system are shown in FIG. 2. Catalytic reactor 1 is formed by enlarged cylindricalfrustoconical housing 2 having inlet 3 and outlet 4. Located within housing 2 is catalyst bed 5 which, in this embodiment, is a honeycomb alumina-magnesia-silica monolithic ceramic supported platinum catalyst as described in U.S. Pat. No. 3,441,381, incorporated fully herein by reference.

Connected to inlet 3 is plate or vane unit 6 comprising tubular housing 7 containing vanes 9, 10, 11, 12, 13, and 14. These vanes can be welded to the inside of housing 7 or held in place by any equivalent means. They are preferably but not necessarily spaced about $1/16''-\frac{1}{2}''$ apart, more preferably about $1/16''-\frac{3}{8}''$ apart, and most preferably $1/16''-\frac{1}{4}''$ apart. Each vane or plate can be seen to be substantially parallel to one another when installed in housing 7 and has a leading edge, exemplified by 15 normal to the flow of gas in the system. Vane thickness can vary from 1/32 " to 5/32" or have any other convenient thickness.

Vane unit 6 is connected by pipe 16 to the exhaust outlet of an internal combustion engine (not shown) and is adapted to conduct hot exhaust gas from the engine to vane unit 6 from which it proceeds directly into catalytic reactor 1.

Figure 6:
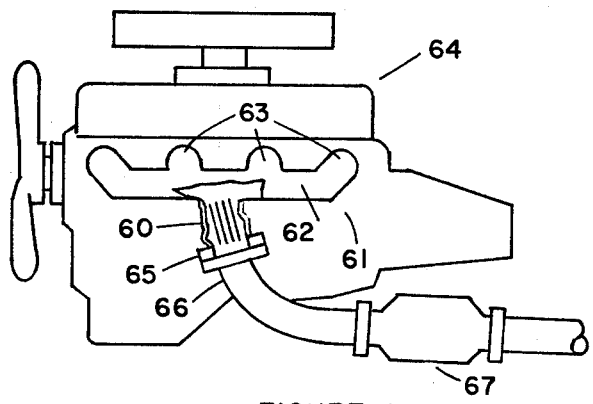
FIG. 6 shows an internal combustion engine including a catalytic reactor in its exhaust system with the outlet portion of its exhaust manifold cut-away to show an internal series of parallel vanes.

In order to obtain rapid warm-up required for catalyst activation, the catalytic reactor is preferably located proximate to the engine exhaust outlet. In some embodiments catalytic reactor 1 is connected through vane unit 6 directly to the engine exhaust manifold outlet. In fact, vane unit 6 can be constructed as part of the internal structure of the exhaust manifold as shown in FIG. 6 thereby permitting direct connection of catalytic reactor 1 to the manifold outlet.

As mentioned above, the catalytic reactor is preferably, but not necessarily, proximate to the engine. By "proximate" is meant that it is close enough such that the catalyst bed is rapidly heated to "light-off" or activation temperature. The exhaust gas temperature required to accomplish this is dependent upon the nature of the catalyst. Noble metal catalysts containing at least some noble metal such as platinum, palladium, or mixtures thereof, light-off at much lower exhaust temperatures, e.g., 350°–500° F. However, in order to insure early light-off, the catalytic reactor is preferably located such that the inlet exhaust temperature is above about 1000° F., and more preferably above about 1400° F., during normal engine cruise conditions. It is also under these conditions that the cyclopentadienyl manganese antiknocks are most likely to plug the catalyst and, hence, it is under these preferred conditions that the present invention is most useful.

The exhaust system of this invention is useful in both chemical oxidation and reduction applications of catalytic exhaust reactors. When reduction of nitrogen oxides is desired the engine is operated slightly rich (e.g., below 14/1 air/fuel ratio) without employing air injection. When oxidation of hydrocarbons and carbon monoxide is desired the oxygen content of the exhaust gas is increased by either operating lean (e.g., above 15/1 air/fuel ratio) or by injecting air into the exhaust gas, or both. The present invention is most useful when used in exhaust gas oxidation applications, although it is by no means limited to this.

As stated above, the embodiment being discussed uses a honeycomb monolithic ceramic supported platinum catalyst as described in U.S. Pat. No. 3,441,381. These are made by coating a corrugated ceramic structure such as described in U.S. Pat. No. 3,444,925 (incorporated herein by reference) with an activated alumina (e.g., gamma-alumina) and a platinum compound. The preferred ceramics are made according to U.S. Pat. No. 3,444,925 using alumina-silica (e.g., mullite, $3Al_2O_3 \cdot 2SiO_2$), magnesia-alumina-silica (e.g., cordierite, $2MgO \cdot 2Al_2O_3 \cdot 5SiO_2$), or mixtures thereof. Palladium can be used in place of platinum, and since these elements generally occur in nature together, it is sometimes preferred to use mixtures of platinum and palladium.

The invention is not limited to honeycomb monolithic ceramic supported platinum or palladium catalysts. Examples of other catalytic metals include V, Cr, Mn, Fe, Co, Ni, Cu, Zn, Zr, Nb, Mo, Ru, Rh, Ag, W, Re, Os, Ir, Pb, Ba, and the like. These are generally used in an oxide form. They may be used individually or in various combinations such as Cu-Cr, Cu-Cr-V, Cu-Pd, Mn-Pd, Ni-Cr, and the like. They may be supported on the above monolithic ceramic support or on any other of numerous well-known catalyst supports such as granular, pelletized or extruded alumina, silica, silica-alumina, zirconia, magnesia, alumina-magnesia, and the like. Such catalysts are disclosed in U.S. Pat. Nos. 3,540,838; 3,524,721; 3,447,893; 3,433,581; 3,428,573; 3,425,792; 3,374,183; 3,271,324; 3,224,981; 3,224,831 3,207,704.

In operation, exhaust gas from the engine is conducted by pipe 16 to vane unit 6. On passing through housing 7 the exhaust gas encounters vanes 9, 10, 11, 12, 13, and 14 and flows over these vanes.

After passing through vane unit 6, the exhaust gas enters catalytic reactor 1 at inlet 3 and then enters catalyst bed 5. After traversing catalyst bed 5 wherein the amount of undesirable constituents are lowered, the exhaust gas leaves catalyst reactor 1 at outlet 4 and is conducted by exhaust pipe 8 to a suitable exhaust location.

Figure 1:
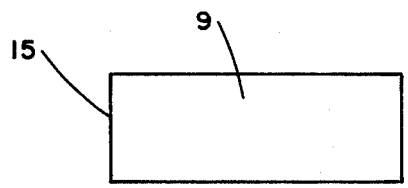
FIG. 1 is a plan view of a vane of this invention.

FIG. 1 shows a preferred embodiment of a vane in the form of a flat plate. It is essentially rectangular in shape and solid. It is to be understood that the plate can have small apertures therein such as slots or perforations. Likewise, the plate can be square or have some other configuration and the leading and trailing edges can be straight, curved, pointed, irregular or have some other configuration.

Figure 3:
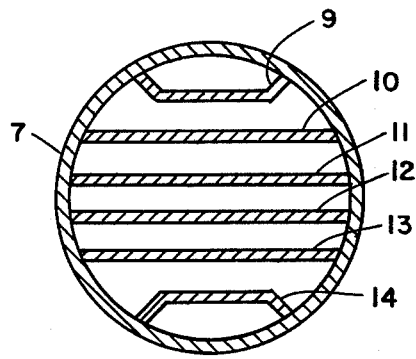
FIG. 3 is a cross-sectional view of the vane unit taken at AA and also the exhaust pipe taken at BB.

The number of vanes is not critical and 4–10 can be used. More or less plates can also be employed. Vane size is not critical. As shown by FIG. 3, the vanes can abut housing 7 but it is not necessary for them to do so and vanes need not abut 7 along their entire length. In general, vanes are usually greater than ½ inch in length, preferably at least two inches, but not more than about 12 inches. Vanes can be made of steel, cast iron, Inconel, or other suitable substance.

As stated previously, it is generally desirable to have the catalytic reactor close to the engine to insure early light-off. In one embodiment inlet 3 of catalytic reactor 1 is connected directly to the outlet of the engine exhaust manifold.

Figure 3A:
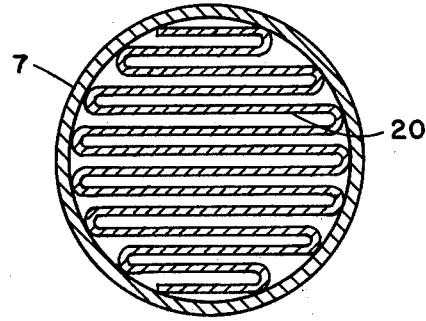
FIG. 3A is a cross-section as in FIG. 3 of an optional pleated vane arrangement.
Figure 3B:
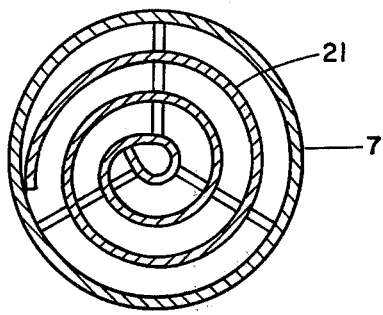
FIG. 3B is a cross-section as in FIG. 3 of an optional spiral vane arrangement.
Figure 3C:
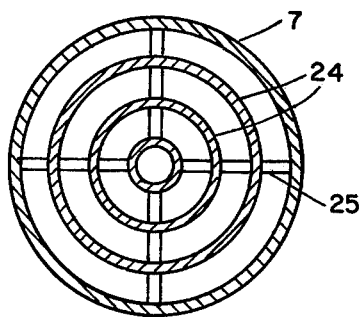
FIG. 3C is a cross-section as in FIG. 3 of an optional concentric circular vane arrangement.

FIGS. 3A, 3B and 3C show optional arrangements of equivalent vanes as viewed at section AA. In FIG. 3A the vanes are formed from a piece of sheet metal folded in pleat-fashion to form a unitary vane which can be merely wedged into tubular housing 7.

In FIG. 3B the vane is formed from a spirally coiled piece of sheet metal 21 which can be wedged into tubular housing 7. Although this unit contains a single continuous spiral vane, it is equivalent to the multi-vane unit because it functions in substantially the same manner to achieve substantially the same results due to its having a plurality of proximately spaced opposing vane surfaces which are substantially parallel longitudinally and aligned with the exhaust gas flow path.

In FIG. 3C the vanes are proximately spaced concentric tubular vanes 24 supported by spider bracket 25 inside tubular housing 7. These tubular vanes are substantially parallel longitudinally and are aligned in the direction of exhaust gas flow.

Figure 4:
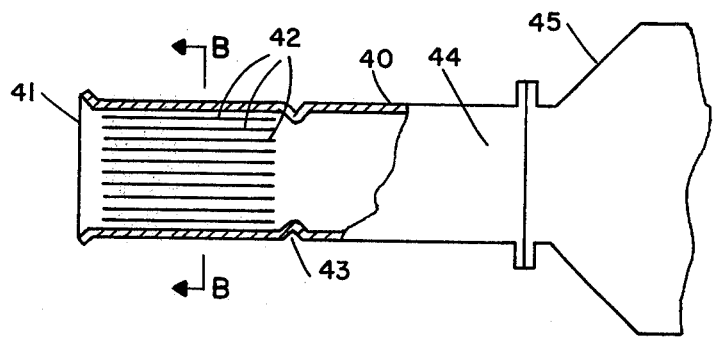
FIG. 4 is a partially cut-away section of an end portion of an exhaust pipe containing parallel vanes.

In FIG. 4 parallel vanes 42 are located in exhaust pipe 40 proximate to flanged end 41 which is adapted to connect to the exhaust outlet of an engine exhaust manifold (not shown). Cross-section BB shows the vane arrangement which can be in the form shown in FIGS. 3, 3A, 3B, 3C or other equivalent forms. Preferably, vane 42 is in the form of pleated sheet metal (FIG. 3A) or a spiral coil (FIG. 3B). The vanes are prevented from sliding further down exhaust pipe 40 by crimp 43. The other end 44 of exhaust pipe 40 connects to the inlet of catalytic reactor 45.

Figure 5:
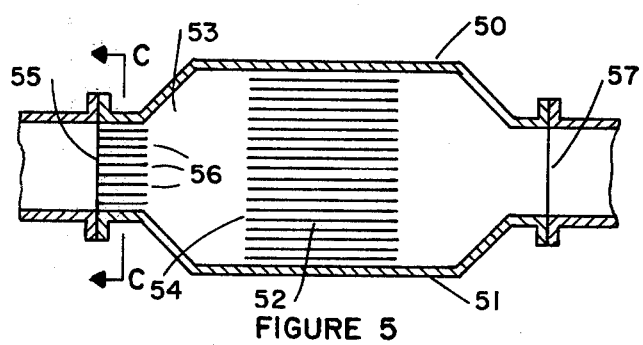
FIG. 5 is a cross-section of a catalytic reactor having a plurality of longitudinal parallel vanes in its inlet plenum.

The series of vanes or plates may be located within the catalytic reactor upstream from the catalyst bed. Such an embodiment is shown in FIG. 5. Catalytic reactor 50 formed by housing 51 contains catalyst bed 52 which forms inlet plenum 53 between catalyst entry surface 54 and reactor inlet 55. Located in inlet plenum 53 proximate to inlet 55 is a plurality of substantially parallel proximately spaced (e.g., 1/16″–⅜″) vanes 56. These vanes are about one inch long. Vanes 56 are aligned longitudinally such that their surface is substantially aligned with the flow path of exhaust gas passing from inlet 55 to catalyst surface 54. In this embodiment, catalyst bed 52 is a honeycomb monolithic ceramic supported platinum catalyst as described in U.S. Pat. No. 3,441,381. Exhaust gas enters catalytic reactor 50 at inlet 55 and passes between vanes 56. It then passes through catalyst bed 52 and leaves the reactor at outlet 57.

In FIG. 6 the vanes are in outlet extension 60 of exhaust manifold 61 formed by manifold housing 62. Exhaust inlets 63 are adapted to connect to the exhaust ports of engine 64 and receive exhaust gas from these exhaust ports. Outlet extension 60 is adapted by flange 65 to connect to exhaust pipe 66 which in turn connects to catalytic reactor 67. Located within outlet extension 60 are a plurality of substantially parallel proximately spaced vanes. The surface of these vanes is aligned in the direction of the flow path of exhaust gas passing through extension 60. The vanes are typically 1/16″–¼″ apart and can be in any of the forms previously shown, e.g., plates, pleated sheet metal, spirally coiled sheet metal, concentric tubes, and their equivalents, or may be cast integral with the exhaust manifold.

It is not clear exactly how the invention functions to reduce catalyst plugging by cyclopentadienyl manganese antiknocks, but tests have been conducted which show that it is highly effective in accomplishing this objective. These tests were made using a single cylinder 36 CID engine operating on gasoline containing one gram of manganese per gallon as methylcyclopentadienyl manganese tricarbonyl. Air/fuel ratio was adjusted to approximately 16/1 to obtain 1.8 percent oxygen in the exhaust. The engine was continuously operated at wide open throttle and the exhaust gas conducted to a catalytic reactor of the type shown in FIG. 2 containing a honeycomb monolithic ceramic supported platinum catalyst (Engelhard Industries, Inc., PTX-313). The exhaust temperature at the catalyst inlet was about 1500° F. in all tests. Exhaust back pressure was measured to determine degree of catalyst plugging. Initial back pressure was about 0.3 psig. An increase to 2 psig was considered a plugged catalyst bed. Results obtained compared to a no plate control are shown in the following table.

|  | Hours to plugging |
|---|---|
| Control | 45 |
| Device of FIG. 2 | 380 |

As the results show, the present invention is highly effective in alleviating the catalyst plugging problem associated with use of exhaust gas catalysts in engines operating on fuel containing a manganese antiknock.

I claim:

1. An exhaust system especially adapted for use with an internal combustion engine operating on gasoline containing a cyclopentadienyl manganese antiknock, said system comprising a catalytic reactor having an inlet and an oulet, said reactor containing a catalyst bed, said catalyst bed consisting essentially of a catalytic metal supported on a honeycomb monolithic ceramic support, said inlet being operatively connected to receive the exhaust gas from the exhaust outlet of said engine through exhaust conduit means, said system including a plurality of substantially parallel vanes spaced about 1/16-⅜" apart located in said exhaust conduit means at a position which is immediately upstream from said inlet, the surface of said vanes being substantially aligned with the longitudinal axis of said conduit means, said vanes functioning to inhibit the plugging of said catalyst bed by manganese compounds in said exhaust gas at temperatures above about 1400° F. said vanes being solely responsible for the inhibition of plugging which is obtained when said vanes are arranged immediately upstream from said inlet.

2. An exhaust system of claim 1 wherein said catalytic metal is selected from the group consisting of platinum, palladium and mixtures thereof.

3. An exhaust system of claim 1 wherein said vanes are spaced about 1/16" to ¼" apart.

4. An exhaust system of claim 1 wherein said ceramic support is selected from the group consisting of alumina-silica, alumina-magnesia-silica and mixtures thereof.

5. An exhaust system of claim 4 wherein said ceramic support is selected from the group consisting of mullite, cordierite and mixtures thereof.

6. An exhaust system of claim 4 wherein said catalytic metal is selected from the group consisting of platinum, palladium and mixtures thereof.

7. An exhaust system of claim 1 wherein said catalytic reactor is located in said exhaust system such that exhaust gas entering said catalytic reactor is above about 1000° F. during normal engine cruise conditions.

8. An exhaust system of claim 1 wherein said exhaust conduit means has a lower cross-sectional area than that of the entry surface of said catalyst bed, said catalytic reactor having an expansion zone to expand the cross-sectional flow area from that of exhaust conduit means to that of said entry surface of said catalyst bed, said parallel vanes being located in said lower cross-sectional area of said conduit means immediately upstream from said expansion zone.

9. A method of inhibiting the plugging of an exhaust gas catalyst in the exhaust system of an internal combustion engine operating on gasoline containing methylcyclopentadienyl manganese tricarbonyl antiknock, said catalyst consisting essentially of a catalytic metal supported on a honeycomb monolithic ceramic support, said method comprising passing said exhaust gas between a plurality of substantially parallel vanes spaced about 1/16-⅜" apart and then immediately into a catalytic reactor containing said catalyst, said vanes functioning to inhibit the plugging of said catalyst by manganese compounds in said exhaust gas at temperatures above about 1400° F. said vanes being solely responsible for the inhibition of plugging which is obtained when said vanes are arranged immediately upstream from said catalytic reactor.

10. A catalytic reactor adapted to inhibit the plugging of a catalyst bed contained within said catalytic reactor when said catalytic reactor is used in the exhaust system of an internal combustion engine operating on gasoline containing a cyclopentadienyl manganese antiknock, said reactor comprising a reactor housing having an inlet and an outlet and a catalyst bed disposed within said housing in a manner such that exhaust gas will pass through said catalyst bed in passing from said inlet to said outlet, said catalyst bed consisting essentially of a catalytic metal on a honeycomb monolithic ceramic support, said inlet comprising a straight conduit section adapted to connect to exhaust conduit means, said straight conduit section containing a plurality of substantially parallel vanes spaced about 1/16-⅜" apart and located immediately upstream from said catalyst bed, the surface of said vanes being substantially aligned with the longitudinal axis of said straight conduit section, said vanes functioning to inhibit the plugging of said catalyst bed by manganese compounds in exhaust gas at temperatures above about 1400° F. said vanes being solely responsible for the inhibition of plugging which is obtained when said vanes are arranged in said inlet.

11. A catalyst reactor of claim 10 wherein said catalyst metal is selected from the group consisting of platinum, palladium and mixtures thereof.

12. A catalytic reactor of claim 11 wherein said ceramic support is selected from the group consisting of alumina-silica, alumina-magnesia-silica and mixtures thereof.

13. A catalytic reactor of claim 10 wherein said vanes are spaced about 1/16" to ¼" apart.

14. A catalytic reactor of claim 10 wherein said reactor housing contains an expansion zone between said inlet and the entry surface of said catalyst bed wherein the cross-section of the flow area increases from the cross-sectional area of said inlet to the surface area of said entry surface.

* * * * *